(12) United States Patent
Kaibara

(10) Patent No.: US 6,471,857 B1
(45) Date of Patent: Oct. 29, 2002

(54) FILTER APPARATUS WITH SAND FILTER BED

(75) Inventor: Kazutoshi Kaibara, Chiba (JP)

(73) Assignee: Koyo Engineering Co., Ltd., Tokyo (JP)

(*) Notice: Subject to any disclaimer, the term of this patent is extended or adjusted under 35 U.S.C. 154(b) by 0 days.

(21) Appl. No.: 09/868,621

(22) PCT Filed: Oct. 24, 2000

(86) PCT No.: PCT/JP00/07441
§ 371 (c)(1),
(2), (4) Date: Jun. 25, 2001

(87) PCT Pub. No.: WO01/30474
PCT Pub. Date: May 3, 2001

(30) Foreign Application Priority Data

Oct. 27, 1999 (JP) .......................................... 11-305723

(51) Int. Cl.$^7$ ............................................... B01D 24/46
(52) U.S. Cl. ...................... 210/189; 210/268; 210/274; 210/275; 210/279
(58) Field of Search ................................ 210/189, 268, 210/274, 275, 279

(56) References Cited

U.S. PATENT DOCUMENTS

| | | | | |
|---|---|---|---|---|
| 3,537,582 A | * | 11/1970 | Demeter | 210/189 |
| 3,598,235 A | * | 8/1971 | Demeter | 210/189 |
| 3,667,604 A | * | 6/1972 | Lagoutte | 210/189 |
| 4,060,484 A | | 11/1977 | Austin et al. | 210/189 |
| 4,197,201 A | * | 4/1980 | Hjelmner et al. | 210/189 |

FOREIGN PATENT DOCUMENTS

| | | |
|---|---|---|
| EP | 0 128 234 | 12/1984 |
| WO | WO 95/13124 | 5/1995 |

* cited by examiner

Primary Examiner—Ivars Cintins
(74) Attorney, Agent, or Firm—Armstrong, Westerman & Hattori, LLP

(57) ABSTRACT

A filter apparatus removes foreign substances contained in raw water by passing the raw water through a filter layer (8) made up of a particulate filter medium disposed in a filter tank (1). The apparatus is made up of: a partition wall (2) provided inside the filter tank (1) so as to extend from an upper end of the filter tank (1) downward while leaving a space to a bottom surface (7) of the filter tank (1) such that the filter tank (1) is divided into a supply portion (4) having a raw water supply port (3) and a discharge portion (6) having a backwashed water discharge port (5); wherein the bottom surface (7) of the filter tank (1) is inclined from the discharge portion (6) downward toward the supply portion (4), the bottom surface (7) having the filter medium spread thereon in a manner to cover both the supply portion (4) and the discharge portion (6), the filter medium being filled to such a depth that an upper end of the filter medium reaches at least a bottom end of the partition wall (2); water collecting pipe (10) embedded inside the filter medium for collecting filtered water; and backwashing device for backwashing the filter medium.

9 Claims, 7 Drawing Sheets

FILTER APPARATUS WITH SAND FILTER BED

TECHNICAL FIELD

The present invention relates to a filter apparatus for removing foreign substances which are contained in foul water to be treated, by passing the foul water through a filter layer which is made up of a particulate filter medium such as sand or the like. The foul water includes river water to be taken in from a river for use as clear water, waste water to be discharged from factories or plants, or the like.

BACKGROUND ART

As a conventional filter apparatus, there has been known the following as shown in FIG. 6. Namely, inside a cylindrical container (or tank) d, there is provided a filter layer v which is made up of a filter medium such as sand or the like. In close proximity to a bottom portion of this container d, there is provided a funnel member e whose upper circumferential end is fixed to an inner circumferential surface of the container d. There is further provided a conical sand separator g while keeping a clearance f between a lower end of the funnel member e and the inner circumferential surface of the container d. The clearance f is for the sand to pass through. A raw water intake h is formed between an outer side surface of the funnel member e and the inner circumferential surface of the container d. The raw water to be supplied under pressure into the container d from the raw water intake h is forced upward through the filter layer v to thereby filter the raw water. The filtered water is taken out of the container d through an overflow sluice i which is provided on an upper portion of the container d.

The sand, serving as a filter medium, which has been contaminated or fouled by foreign substances as a result of the process of filtering the raw water is gradually collected, through the clearance f, into a sand collecting box k which is disposed at the lower end of the container d. The collected sand is sent, through a lifting pipe m, together with the raw water which serves as transporting water to a washing and separating device p which is provided at the top of the container d. In this washing and separating device p, fresh washing water is supplied from a supply pipe n which is provided at the top of the washing and separating device p. The sand which is washed by the washing water and separated from the raw water is returned to the container d. After washing the sand, the washing water is discharged from a washing water discharge port r, and the raw water is discharged from a water discharge port s. In this manner, the washing of the fouled filter sand can be continuously performed while the filtration of the raw water is constantly performed.

There is also known one as shown in FIG. 7. In this conventional apparatus, the raw water is supplied circumferentially from a central portion of a cylindrical filter layer v. Water collecting pipes t are disposed in the peripheral portion of the filter layer v to thereby take out the filtered water from the water collecting pipes t. At a bottom portion of the cylindrical filter layer v, there is provided a backwashing water supply port w. An air lift pipe u is also provided through a central portion of the filter layer v. In this arrangement, the filter medium from a highly fouled portion can be washed while it passes through the air lift pipe u.

The above-described conventional apparatuses have the following disadvantages. Namely, in the former apparatus, the washing and separating device p is disposed in an upper portion of the filter layer where the filtered water is collected. Therefore, the raw water which contains therein the filter medium to be discharged out of the washing and separating device p gets mixed with the filtered water. In addition, in this apparatus, the area of the filter layer which comes into contact with the raw water cannot be made larger than the cross-sectional area of the container d. If the area of the filter layer is made larger, the diameter of the container d must be enlarged, resulting in a filter apparatus which is larger in size.

In the latter apparatus, the foreign substances contained in the filter medium are caused to be gradually suspended and separated upward by the backwashing water to be sent upward from the backwashing water supply port w. Therefore, like in the above-described former conventional apparatus, the washing process takes time and the washing cannot be performed sufficiently.

DISCLOSURE OF INVENTION

According to one aspect of the present invention, there is provided a filter apparatus for removing foreign substances contained in raw water by passing the raw water through a filter layer made up of a particulate filter medium disposed in a filter tank, the apparatus comprising: a partition wall provided inside the filter tank so as to extend from an upper end of the filter tank downward while leaving a space to a bottom surface of the filter tank such that the filter tank is divided into a supply portion having a raw water supply port and a discharge portion having a backwashed water discharge port; wherein the bottom surface of the filter tank is inclined from the discharge portion downward toward the supply portion, the bottom surface having the filter medium spread thereon in a manner to cover both the supply portion and the discharge portion, the filter medium being filled to such a depth that an upper end of the filter medium reaches at least a bottom end of the partition wall; water collecting means embedded inside the filter medium for collecting filtered water; and backwashing means for backwashing the filter medium.

According to the above arrangement, a stable filter layer which has an angle of repose of the filter medium can be formed on the inclined bottom surface. Therefore, it is possible to form a filter layer of large area of contact with the raw water.

Preferably, the backwashing means comprises: an air lift pipe having a suction port which is embedded into the filter medium in the supply portion and a discharge port which opens above the filter medium in the discharge portion; and a backwashing pipe for supplying backwashing water into the suction port of the air lift pipe. The air lift pipe is provided in at least two in number, one having a suction port which opens into an upper layer of the filter medium and the other having a suction port which opens into a bottom layer of the filter medium. Further, the partition wall is inclined toward the discharge portion at least at a lower section thereof, the lower section having a plurality of openings passing through the partition wall.

According to the above-described arrangement, an upper surface of the filter layer can be set to a level higher than the lower end level of the partition wall. Further, when the backwashing means is operated, the filter medium is sucked from the filter layer into the air lift pipe and is washed inside the air lift pipe by means of the backwashing water. As a result, the backwashing water containing therein the foreign substances is discharged out of the filter apparatus through a backwashed water discharge port, and the filter medium which has been cleaned of the foreign substances is returned to an upper surface of the filter layer in the discharge portion. The filter medium on the bottom surface of the filter tank thus moves toward the suction port of the air lift pipe along the inclined bottom surface of the filter tank. Accordingly, all of the filter medium can be moved into the suction port of the air lift pipe in an orderly manner.

Preferably, the backwashing water to be used in the backwashing means is taken from the water collecting means. According to this arrangement, there is no need of separately providing a tank for storing therein the backwashing water.

BEST MODE FOR CARRYING OUT THE INVENTION

An explanation will now be made about the best mode for carrying out the invention with reference to the accompanying drawings.

Figure 1:
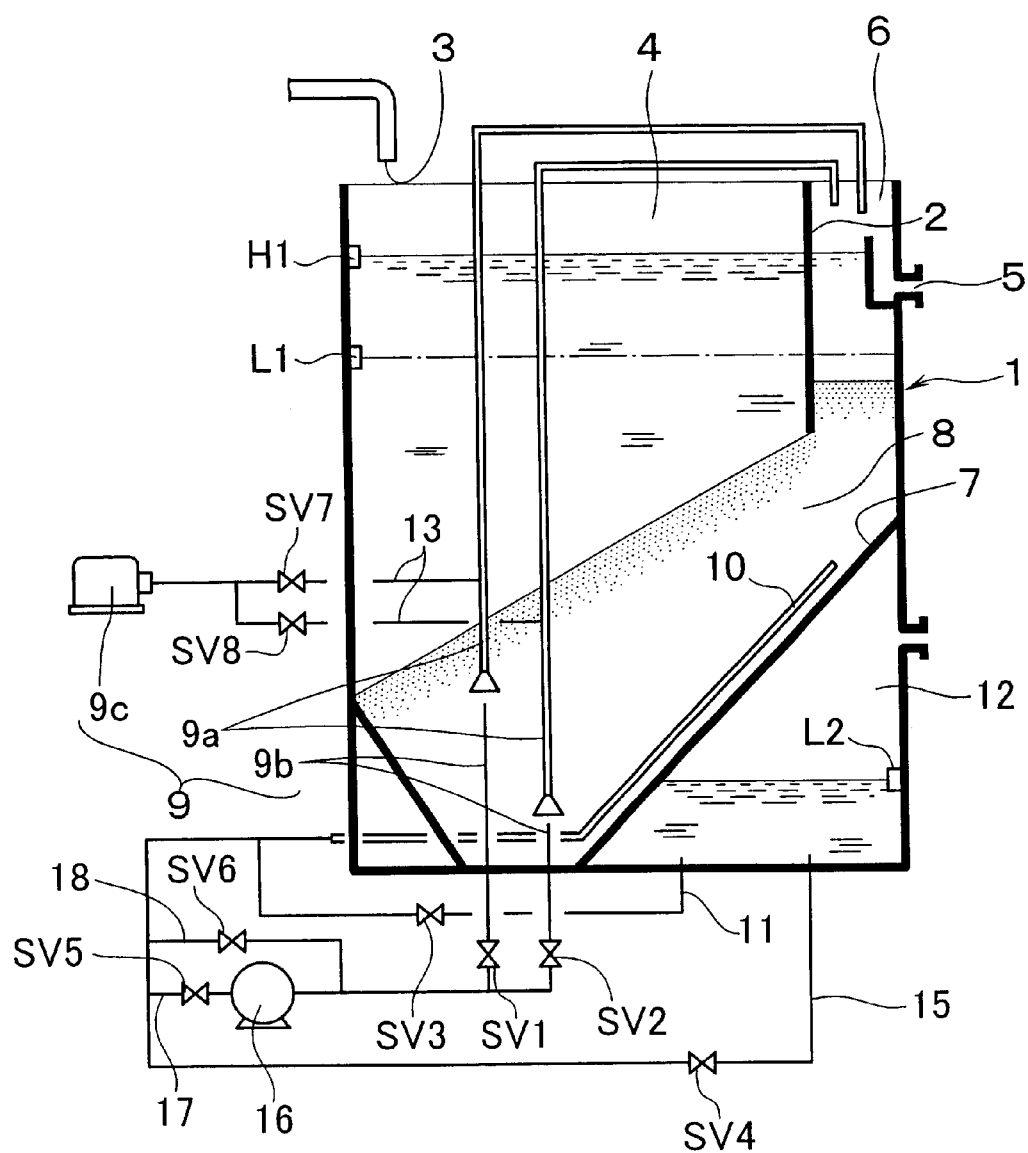
FIG. 1 is a schematic diagram of a filter apparatus of the present invention.

In FIG. 1, reference numeral 1 denotes a filter tank which is about 3 m high in one example. The filter tank 1 is internally divided by a partition wall 2 into two portions, i.e., a water supply portion 4 to which a raw water supply port 3 faces or is connected, and a water discharge portion 6 to which is connected a water discharge port 5 for discharging backwashing water containing foreign substances removed from the raw water. A bottom surface 7 of the filter tank 1 is formed into an inclined surface which inclines from an upper end on the side of the discharge portion 6 downward toward a lower end on the side of the supply portion 4.

The partition wall 2 is constituted in the following manner. Namely, it extends from an upper end of the filter tank 1 vertically downward, but the lower end thereof does not extend to reach the inclined bottom surface 7. In this manner, a space or a clearance is secured between the lower end of the partition wall 2 and the bottom surface 7 of the filter tank 1. The supply portion 4 and the discharge portion 6 are thus arranged to be in fluid flow communication with each other below the lower end of the partition wall 2. A filter medium of particulate material such as sand or the like is filled from the discharge portion 6 into the filter tank 1 until the filter medium reaches the height of at least the bottom end of the partition wall 2. Raw water is then filled into the filter tank 1 from the raw water supply port 3.

There are provided two air lift pipes 9a, 9a which face a surface layer of the filter medium and one air lift pipe 9a which faces a bottom layer of the filter medium. These air lift pipes 9a, 9a are arranged to circulate the filter medium in cooperation with compressed air to be supplied form an air blower 9c and backwashing water to be supplied directly from water collecting means 10, as described in more detail hereinbelow. The filter medium is thus transported by the air lift pipes 9a, 9a from the supply portion 4 to an upper part of the discharge portion 6. The filter medium then returns toward the supply portion 4 due to the weight of the filter medium itself. By repeating this operation, the filter medium forms a filter layer 8 which is laid down, or accumulated, over the entire bottom surface 7 of the filter tank 1 while maintaining a certain inclination depending on an angle of repose of the filter medium.

By the way, in an example in which the partition wall 2 is formed into a vertically extending wall as shown in FIG. 1, the upper surface of the filter layer 8 is set to a level which is approximately equal to the lower end of the partition wall 2. When the filter medium is backwashed as described in detail hereinafter, there is the following tendency. Namely, when the filter medium which is sent from the supply portion 4 to the discharge portion 4 by the air lift pipes 9a, 9a moves due to its own weight toward the supply portion 4, the filter medium moves along that surface of the filter layer 8 which is subject to a smaller flow resistance and which is, therefore, easy for the filter medium to flow along. In other words, only part of the filter medium moves.

Figure 2:
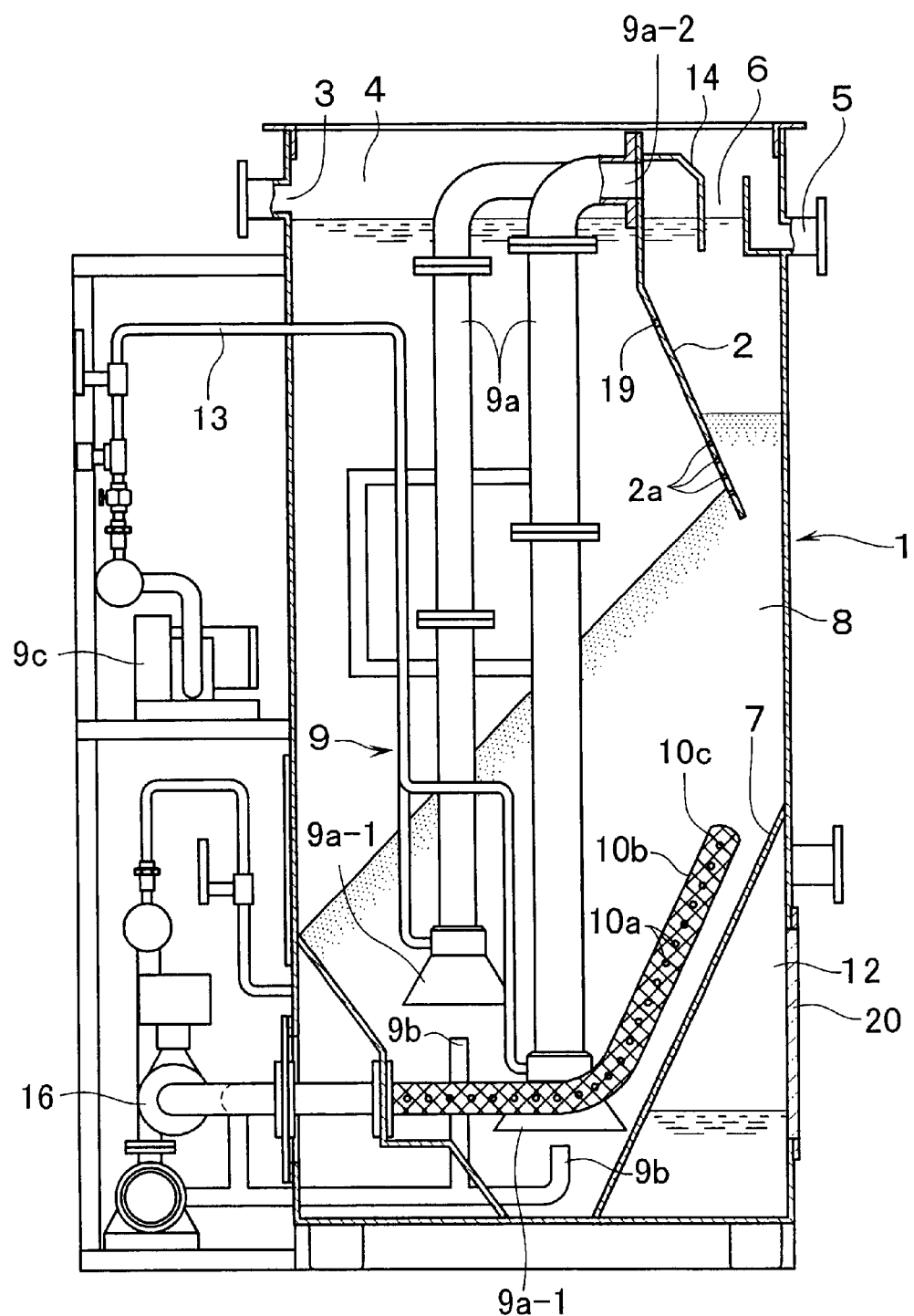
FIG. 2 is a sectional view of a modified example of the filter apparatus of the present invention.
Figure 3:
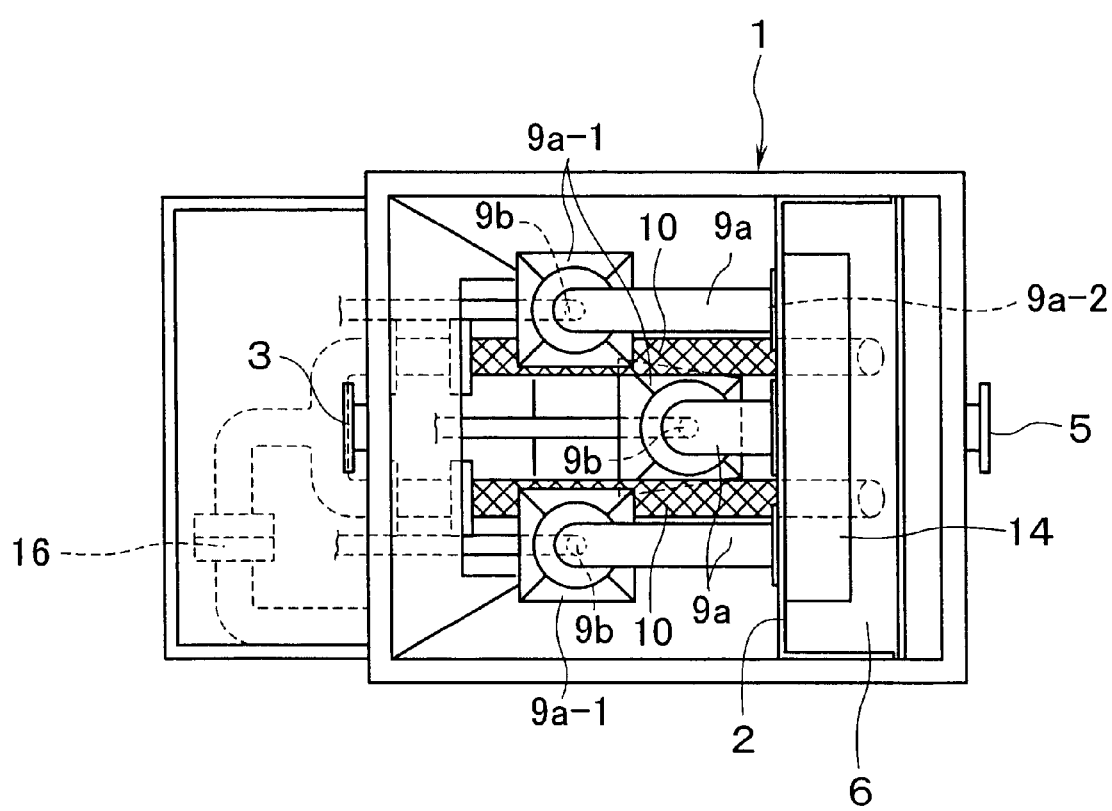
FIG. 3 is a plan view of FIG. 2.
Figure 4:
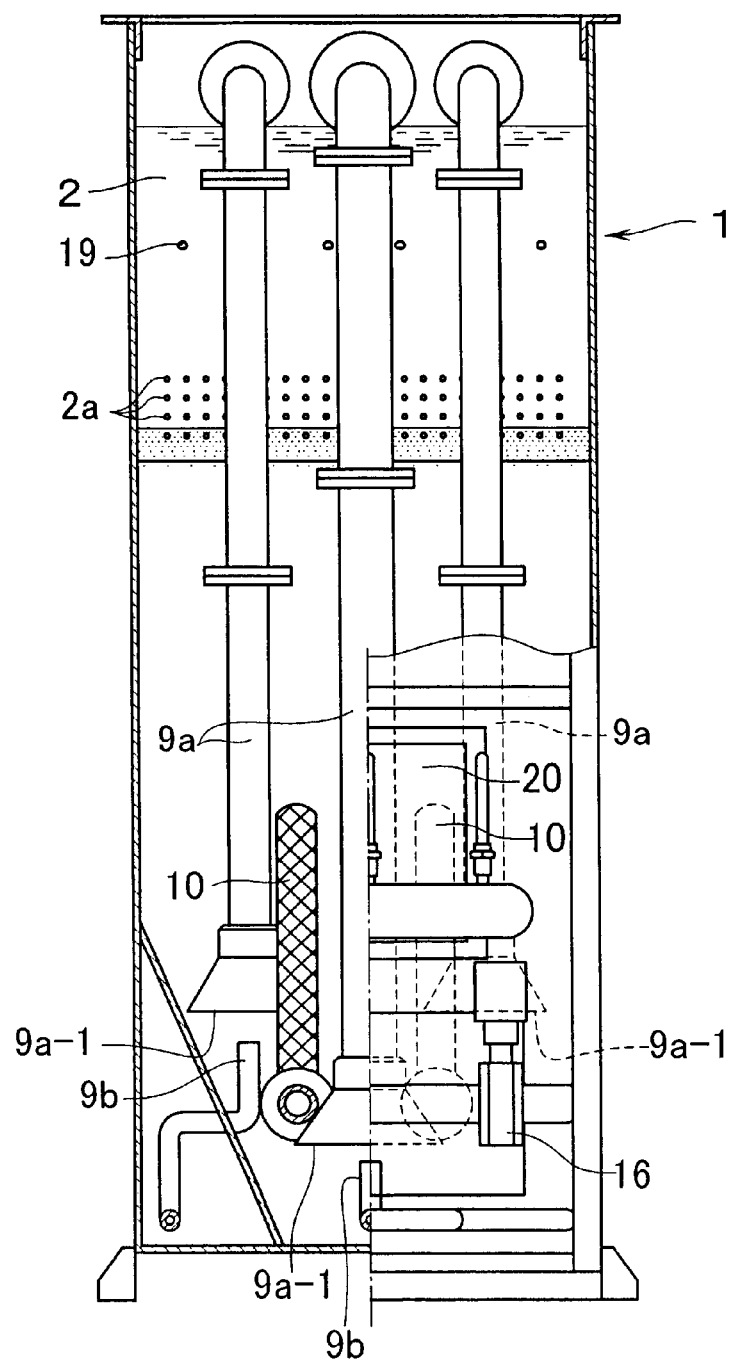
FIG. 4 is a front view of FIG. 2.

To avoid this tendency, an arrangement may also be made as shown in FIGS. 2 through 4. In this modified example, a lower section of the partition wall 2 is inclined or bent toward a side wall of the filter tank 1 in the discharge portion 6 so that the lower end of the partition wall 2 becomes closer to the side wall. In this arrangement, a resistance is given to the flow of the filter medium which flows along the lower section of the partition wall 2. The lower section of the partition wall 2 is further provided with a large number of perforations, or throughgoing openings, 2a of about 10 mm through 15 mm in diameter in a plurality of vertically arranged rows. By thus causing the filter medium to flow through the openings 2a into the supply portion 4, the upper surface of the filter layer 8 can be set at a level which is higher than the lower end of the partition wall 2.

Reference numeral 10 denotes a water collecting means which is embedded inside the filter layer 8 (i.e., inside the filter medium), preferably close to the bottom of the filter layer 8 (i.e., close to the bottom surface 7 of the filter tank). The water collecting means 10 includes, as shown in FIGS. 2 and 3, a hollow tube 10b which is provided in the peripheral wall thereof with a larger number of small openings 10a. A plurality of such hollow tubes 10b are disposed along the inclination of the bottom surface 7 of the filter tank 1. Filtered water to be pushed or forced through the filter medium due to the difference in head of the raw water is collected through the openings 10a into the hollow tubes 10b. Filtered water thus collected is transported, through a water supply pipe 11 (FIG. 1) coupled to each of the hollow tubes 10b, to a filtered-water reservoir 12 which is provided at the bottom of the filter tank 1. Filtered water once stored in the filtered-water reservoir 12 is thereafter fed to a succeeding treatment apparatus (not illustrated).

Each of the hollow tubes 10b is covered on the outer periphery thereof with a wire mesh 10c made of stainless steel or the like whose mesh (opening) is smaller than the particle size of the filter medium. It is thus so arranged that the filter medium, which is about 0.6 mm in diameter in the filter apparatus for use in obtaining clear water for drinking purpose or the like), does not pass through the small openings 10a.

There is provided a backwashing means 9 which includes the air lift pipes 9a, filtered-water supply pipes 9b, the air blower 9c, and others. The air lift pipes 9a are each provided, on one end thereof, with a suction port 9a-1 which is embedded into the filter layer 8 and, on the other end thereof, with a discharge port 9a2 which faces, or opens into, an upper part of the discharge portion 6. The filtered-water supply pipes 9b are arranged to supply the filtered water directly from the hollow tubes 10b of the water collecting means 10.

For attaining the backwashing operation and others, the water piping system and the air piping system, inclusive of the air lift pipes, of the filter apparatus are arranged as follows. The water piping system includes the water supply pipe 11 which connects the outlets of the hollow tubes 10b of the water collecting means 10 to the filtered-water reservoir 12 with a solenoid valve SV3 interposed therein. The water supply pipe 11 from the hollow tubes 10b is further branched, at a position upstream of the solenoid valve SV3, into a pipe 15 which is also connected to the filtered-water reservoir 12 through a solenoid valve SV4 interposed therein, and is further branched into two pipes 17, 18. The pipe 17 is connected through a solenoid valve SV5 to a suction of a water pump 16. The pipe 18 is connected through a solenoid valve SV6 to a discharge of the water pump 16. The discharge of the war pump 16 is further extended, through solenoid valves SV1 and SV2, toward the air lift pipes 9a, 9a, respectively, as explained in more detail hereinbelow. Namely, that pipe with the solenoid valve SV1 is branched on the downstream side of the solenoid valve SV1 into two which are then connected to the filtered-water supply pipes 9b, 9b. These filtered-water supply pipes 9b, 9b are extended close to those suction ports 9a-1, 9a-1 of the air lift pipes 9a, 9a which face the surface layer portion of the filter layer 8, preferably at a lower side in the inclination of the filer layer 8. The solenoid valve SV1 thus serves to control both the branched pipes on the downstream side of the solenoid valve SV1. That pipe with the solenoid valve SV2 is connected to the filtered-water supply pipe 9b which is extended close to the suction port 9a-1 of the remaining air lift pipe 9a. This suction port 9a-1 faces the bottom layer of the filter layer 8, preferably at a lower side in the inclination of the filter layer 8. The degree of extension of each of the filtered-water supply pipes 9b close to the suction port 9a-1 is arranged such that the filter medium is efficiently sucked into the air lift pipe 9a accompanied by the ejection (or projection) of the filtered water into the air lift pipe 9a.

The air piping system, on the other hand, includes the following. The pipe from the air blower 9c is branched into two pipes 13, 13, one with a solenoid valve SV7 and the other with a solenoid valve SV8, respectively. That pipe with the solenoid valve SV7 is branched into two on the downstream side of the solenoid valve SV7 so that they are directly connected to the bottom portion of the two air lift pipes 9a, 9a that have the suction ports 9a-1 facing the surface layer portion of the filter layer 8 as explained hereinabove. The solenoid valve SV7 thus serves to control both the branched pipes on the downstream side of the solenoid valve SV7. The other pipe 13 with the solenoid valve SV8 is directly connected to the bottom portion of the air lift pipe 9a that has the suction port 9a-1 facing the bottom layer of the filter layer 8 as explained hereinabove.

Reference numeral 19 denotes openings which are provided in the partition wall 2 to allow the raw water to pass from the supply portion 4 to the discharge portion 6. The openings 19 are made smaller in opening area than the opening area of the raw water supply port 3. They are provided in position below the water surface in the filter tank1.

Reference numeral 20, 20 denote peep holes which are provided in the filter tank 1 so that the inner conditions can be checked from outside. Reference character L1 denotes a water level detector for detecting a minimum water level in the filter tank 12 and reference character H1 denotes a water level detector for detecting a maximum water level in the water tank 12. Reference character L2 denotes a water level detector for detecting a minimum water level in the filtered-water reservoir 1.

The discharge port of the air blower 9c is also connected to the outlet of hollow tubes 10b of the water collecting means 10.

The filter apparatus is operated by selectively opening and closing the above-described solenoid valves SV1 through SV8 as well as by selectively operating the air blower 9c and the water pump 16 by a sequential control system (not illustrated). Its operation is explained in more detail with reference to FIGS. 2 through 5. The operation can be largely classed into the following, i.e., a) filtration process, b) a surface layer cleaning, c) bottom layer cleaning and d) water collecting pipe cleaning (or hollow tube cleaning).

a) Filtration Process

When the raw water to be supplied from the raw water supply port 3 reaches the minimum water level, this state is detected by the water level detector L1. Based on a signal from the level detector L1, the solenoid valve SV3 is opened. Then, due to the pressure difference between the water surface and the water collecting means 10, the raw water passes through the filter layer 8, and the filtered water is sent out from the hollow tubes 10b of the water collecting means 10 to the filtered-water reservoir 12 through the water supply pipe 11. During this process, the remaining solenoid valves SV1, SV2, SV4, SV5, SV6, SV7, SV8 are closed, and the water pump 16 and the air blower 9c are not operated.

b) Surface Layer Cleaning

The raw water supply from the raw water supply port 3 is continued. When this filtration process continues, the filter layer 8 is gradually filled or contaminated with foreign substances, whereby the filtration speed gradually decreases contained in the raw water. As a result, the water level in the filter tank 1 increases until it reaches the high water level. This high water level is detected by the water level detector H1 and, based on the signal from this detector H1, the solenoid valve SV3 is closed. Instead, the solenoid valve SV5 and the solenoid valve SV1 are opened. The water pump 16 is then operated. At the same time, the air blower 9c is also operated and the solenoid valve SV7 is opened. The solenoid valves SV2, SV4, SV6 and SV8 are or remain closed.

According to the above operations, the pressurized air is supplied from the air blower 9c to both the air lift pipes 9a, 9a which have the suction ports 9a-1, 9a-1 facing the surface layer portion of the filter layer 8. The filter medium on the surface side of the filter layer 8 is thus sucked into the air lift pipes 9a, 9a together with the backwashing water to be supplied directly from the hollow tubes 10b of the water collecting means 10. The filter medium is backwashed and cleaned of the adhered or accumulated foreign substances while being lifted along the air lift pipes 9a, 9a, and is discharged toward the strike plate 14. The filter medium which is larger in mass returns to the filter layer 8 due to its own weight, and the backwashing water including foreign substances or the like is discharged through the discharge port 5 out of the filter tank 1. This backwashing process is continued for, e.g., about 10 minutes. This duration, of course, depends on the size of the filter apparatus and the conditions of the raw water to be filtered. The filter medium on the surface layer side of the filter layer is thus cleaned.

c) Bottom Layer Cleaning

The raw water supply from the raw water supply port 3 is continued. By an order from the sequential control system (not illustrated), the solenoid valve SV1 is closed, and the solenoid valves SV5 and SV2 are opened instead. The solenoid valve SV7 is closed and solenoid valve SV8 is opened instead. The water pump 16 is operated and the air blower 9c is also operated. Solenoid valves SV3, SV4 and SV6 are or remain closed. Like in the above-described process of surface layer cleaning, the filtered water directly from the hollow tubes 10b of the water collecting means 10 is used the for backwashing.

According to the above operations, the pressurized air is supplied from the air blower 9c to both the air lift pipe 9a which has the suction port 9a-1 facing the bottom surface portion of the filter layer 8. The filter medium on the bottom side of the filter layer 8 is thus sucked into the air lift pipe 9a together with the backwashing water to be supplied directly from the hollow tubes 10b of the water collecting means 10. The filter medium in the bottom layer is backwashed and cleaned of the adhered foreign substances while being lifted along the air lift pipes 9a, 9a, and is discharged toward the strike plate 14. The filter medium which is larger in mass returns to the filter layer 8 due to its own weight, and the backwashing water including foreign substances or the like is discharged through the discharge port 5 out of the filter tank 1. The duration and the frequency of this backwashing operation may be arbitrarily selected depending on the operating conditions of the filter apparatus; it may continue, for example, for about 3 minutes.

d) Water Collecting Pipe Cleaning

From time to time, the hollow tubes 10b of the water collecting means 10 shall be cleaned of the foreign substances or the like clogged into the openings 10a of the hollow tubes 10b. This cleaning is made by backwashing the hollow tubes 10b from the inside outward by using the filtered water stored in the filtered water reservoir 12.

The solenoid valves SV4, SV5 and SV6 are opened. The water pump 16 is operated. Solenoid valves SV1, SV2, SV3, SV7 and SV8 are or remain closed. According to these operations, the hollow tubes 10b are washed by the water from the filtered-water reservoir 12 from the inside outward. By the pressurized water, the hollow tubes 10b are thus cleaned of the accumulated or clogged foreign substances. Also, by the forcible discharging of the water out of the hollow tubes 10b, the filter medium in the neighborhood of the hollow tubes 10b is subjected to the expanding or spreading operation. This results in disintegrating that filter medium around the hollow tubes 10b which is likely to be closely compacted toward the hollow tubes 10b.

e) Others

In performing the step c) bottom layer cleaning, it is preferable and advantageous to also perform the following steps. Namely, when the bottom layer cleaning is performed, the foreign substances accumulated in the surface layer are likely to get mixed. Therefore, the steps of a) surface layer cleaning and d) water collecting pipe cleaning are also performed in the order mentioned before starting the step c) bottom layer cleaning. The duration of these steps may be arbitrarily selected depending on the operating conditions. At this time, since the above steps a) and d) are repeated for attaining additional advantages, the duration of those steps may be shorter than that in a routine operation. In this manner, the foreign substances contained in the upper layer of the filter medium and in the hollow tubes 10b are also treated at the same time. After the bottom layer cleaning, the step b) surface layer cleaning is also preferably performed. By performing this surface layer cleaning at the end of the above-described series of operations, there is attained an effect that the surface layer which is roughened as a result of the washing of the filter medium on the bottom layer is smoothened.

Alternatively, after a lapse of every 5 to 8 hours, the solenoid valve SV3 may be closed by using a timer to thereby raise the water level inside the filter tank 1. There is thus generated a condition in which the filter layer 8 has given rise to clogging by foreign substances. In this manner, the above-described series of operations may be performed periodically.

Figure 5:
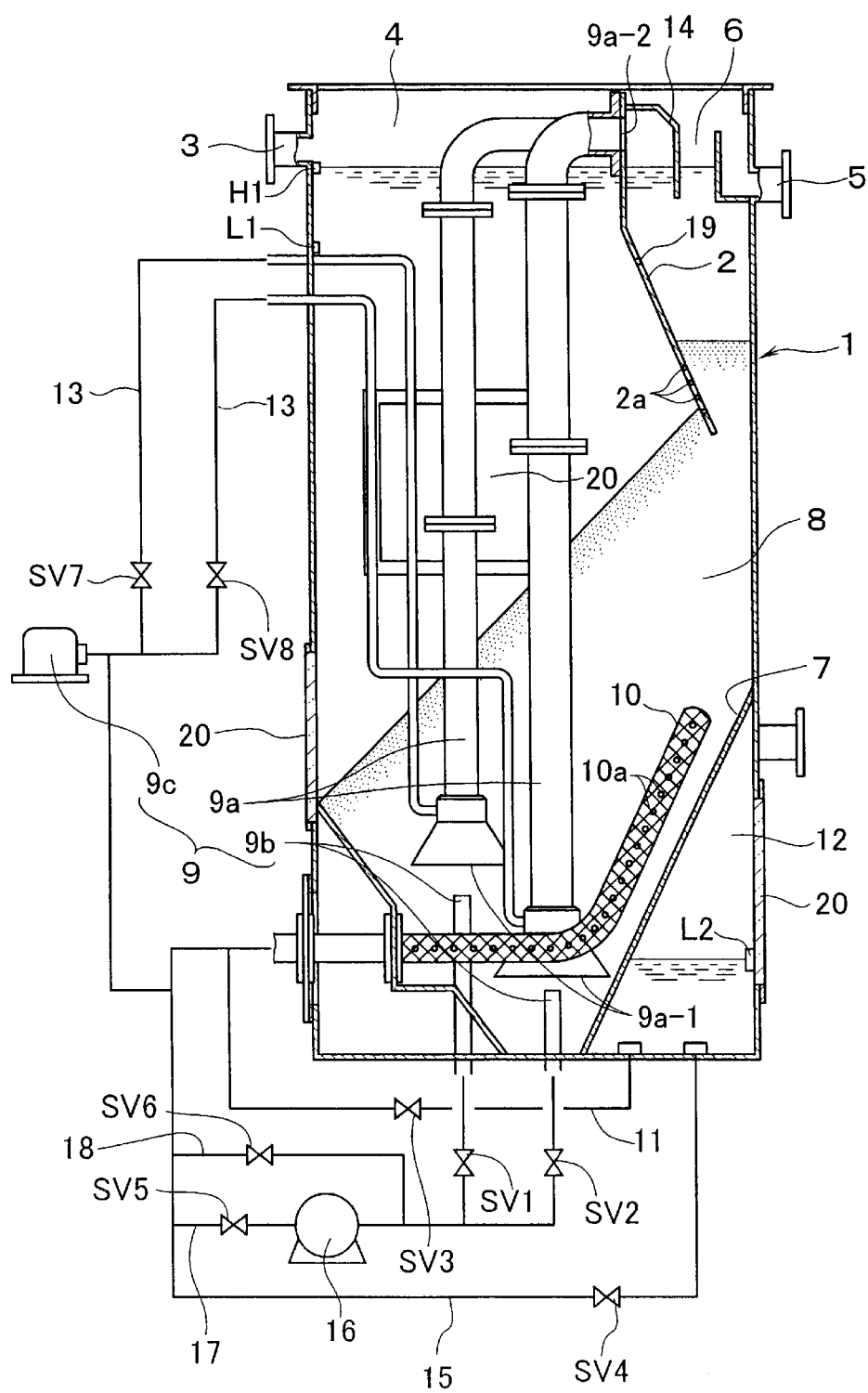
FIG. 5 is a piping diagram of FIG. 2.
Figure 6:
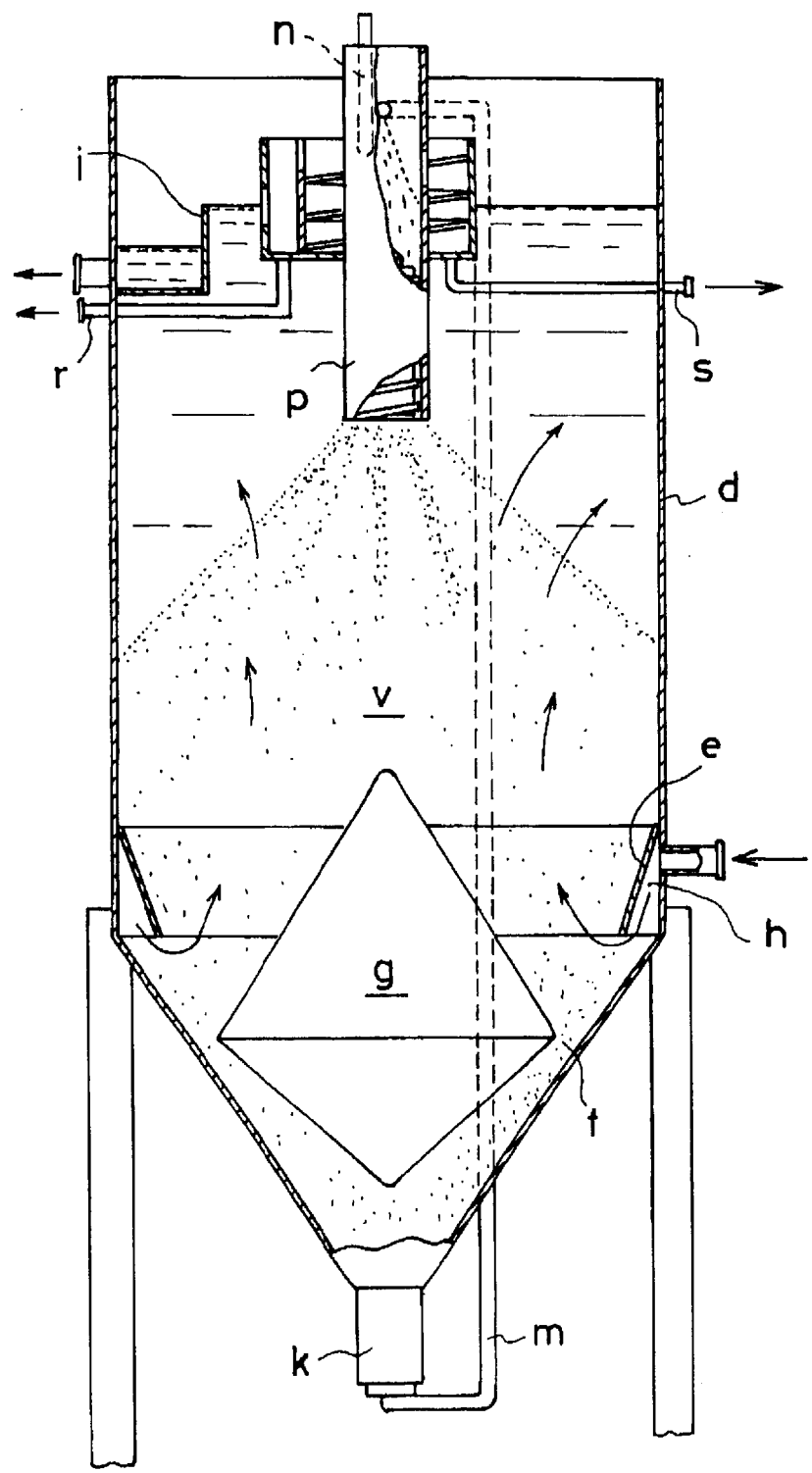
FIG. 6 is a sectional view showing a conventional filter apparatus.
Figure 7:
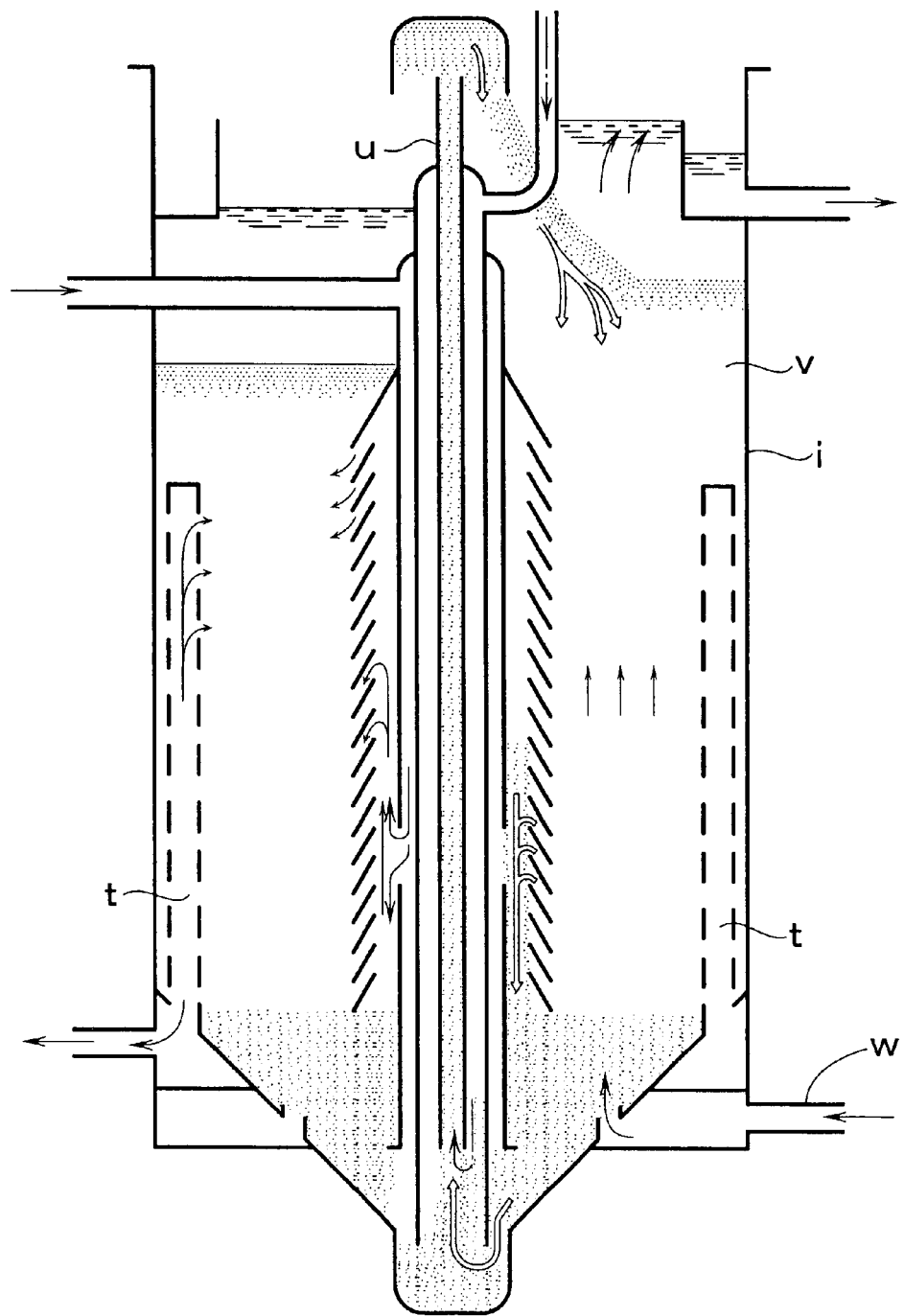
FIG. 7 is a sectional view showing another conventional filter apparatus.

In the above-described example, the washing of the hollow tubes 10b was performed only with the filtered water taken from the filtered water reservoir 12. In addition to the water, the pressurized air from the air blower 9c may additionally be added through the pipe connecting the air blower 9c to the outlet of the hollow tubes 10b (FIG. 5).

Further, the supply of the pressurized air from the air blower 9c is made in a preferable embodiment in an intermittent manner to attain a better backwashing effect.

According to one aspect of the present invention, the raw water will not get mixed into the filtered water. In addition, since a stable filter layer can be formed on the inclined bottom surface of the filter tank along the angle of repose of the filter medium, a filter layer with a large are of contact with the raw water can be formed. A filter apparatus of a high filtering capacity can be obtained within a relatively small area or volume to be occupied by the filter apparatus. Further, the filter medium can thus be introduced or sucked in good circulating order into the air lift pipes of the backwashing means while moving along the inclination of the bottom surface. Therefore, the filter medium can be washed uniformly and efficiently. According to another aspect of the present invention, by inclining the partition wall toward the discharge portion at least at the lower section of the partition wall, and also by forming a plurality of openings passing through the partition wall, the upper surface level of the filter medium can be set at a level higher than the lower end of the partition wall. In backwashing the filter medium, the flow of the filter medium from the discharge portion toward the supply portion can be made more uniformly. Still furthermore, by using the filtered water taken directly from the water collecting pipes (hollow tubes), there is no need of separately preparing filtered water for the backwashing purpose.

Industrial Applicability

The filter apparatus of the present invention can be used in filtering fouled water such as river water, plant waste water, or the like for use as clear water in various aspects of the industrial operations, daily civil activities, or the like.

What is claimed is:

1. A filter apparatus for removing foreign substances contained in raw water by passing the raw water through a filter layer (8) made up of a particulate filter medium disposed in a filter tank (1), said apparatus comprising:

a partition wall (2) provided inside said filter tank (1) so as to extend from an upper end of said filter tank (1) downward while leaving a space to a bottom surface (7) of said filter tank (1) such that said filter tank (1) is divided into a supply portion (4) having a raw water supply port (3) and a discharge portion (6) having a backwashed water discharge port (5);

wherein the bottom surface (7) of said filter tank (1) is inclined from the discharge portion (6) downward toward the supply portion (4), said bottom surface (7) having the filter medium spread thereon in a manner to cover both said supply portion (4) and said discharge portion (6), the filter medium being filled to such a depth that an upper end of the filter medium reaches at least a bottom end of said partition wall (2);

water collecting pipe (10) embedded inside the filter medium for collecting filtered water; and backwashing means (9) for backwashing the filter medium, wherein said backwashing means (9) comprises an air lift pipe (9a) having a suction port which is embedded into the filter medium in said supply portion (4) and a discharge port which opens above the filter medium in the discharge portion (6), and a backwashing pipe (9b) for supplying backwashing water into said suction port of said air lift pipe (9a).

2. The filter apparatus according to claim 1, wherein said air lift pipe (9a) is provided in at least two in number, one having a suction port which opens into an upper layer of said filter medium and the other having a suction port which opens into a bottom layer of said filter medium.

3. The filter apparatus according to claim 2, wherein said partition wall (2) is inclined toward said discharge portion (6) at least at a lower section thereof, said lower section having a plurality of openings (2a) passing through said partition wall (2).

4. The filter apparatus according to claim 2, wherein said backwashing water to be used in said backwashing means (9) is taken from said water collecting pipe (10).

5. The filter apparatus according to claim 1, wherein said partition wall (2) is inclined toward said discharge portion (6) at least at a lower section thereof, said lower section having a plurality of openings (2a) passing through said partition wall (2).

6. The filter apparatus according to claim 1, wherein said backwashing water to be used in said backwashing means (9) is taken from said water collecting pipe (10).

7. The filter apparatus according to claim 6, wherein said backwashing water is supplied with the air into said suction port.

8. The filter apparatus according to claim 1, wherein said partition wall (2) has upper openings (19) and lower openings (2a), allowing the raw water to pass from the supply portion (4) to the discharge portion (6).

9. The filter apparatus according to claim 1, wherein said water collecting pipe (10) is connected through a water pump (16) to a filtered-water reservoir (12) which is provided at a bottom of the filter tank (1).

* * * * *